US006729682B2

(12) United States Patent
Delavalle et al.

(10) Patent No.: US 6,729,682 B2
(45) Date of Patent: May 4, 2004

(54) REAR MODULE FOR A MOTOR VEHICLE

(75) Inventors: Dominique Delavalle, Marchon (FR); Cyrille Rochon, Oyonnax (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 09/789,814

(22) Filed: Feb. 22, 2001

(65) Prior Publication Data
US 2001/0020796 A1 Sep. 13, 2001

(30) Foreign Application Priority Data
Feb. 24, 2000 (FR) .............................. 00 02317

(51) Int. Cl.⁷ .............................................. B62D 25/08
(52) U.S. Cl. ............................ 296/193.08; 296/203.04
(58) Field of Search ........................... 296/203.04, 204, 296/203.01, 29, 193.01, 193.03, 193.04, 193.07, 193.08; 293/117, 114, 126; 362/505

(56) References Cited

U.S. PATENT DOCUMENTS

| 1,647,014 | A | * | 10/1927 | Pattison | |
|---|---|---|---|---|---|
| 2,691,545 | A | * | 10/1954 | Lyon | |
| 2,707,650 | A | * | 5/1955 | Lawton, Jr. ................. | 362/505 |
| 2,988,397 | A | * | 6/1961 | Brueder | |
| 3,005,657 | A | * | 10/1961 | Walker | |
| 4,422,680 | A | * | 12/1983 | Goupy ....................... | 293/126 |
| 4,570,986 | A | * | 2/1986 | Sams ......................... | 293/117 |
| 4,836,600 | A | * | 6/1989 | Miyazaki et al. ........... | 296/204 |
| 4,849,277 | A | * | 7/1989 | Jaklofsky ................... | 428/139 |
| 4,874,200 | A | * | 10/1989 | Nasu et al. ................. | 296/197 |
| 4,887,859 | A | * | 12/1989 | Aper .......................... | 296/196 |
| 4,914,802 | A | * | 4/1990 | Takao et al. ............... | 296/196 |
| 4,968,087 | A | * | 11/1990 | Goria ......................... | 296/193 |
| 5,139,407 | A | * | 8/1992 | Kim et al. .................. | 264/325 |
| 5,260,017 | A | * | 11/1993 | Giles, Jr. .................... | 264/322 |
| 5,833,283 | A | * | 11/1998 | Shaw ......................... | 296/117 |
| 6,007,133 | A | * | 12/1999 | Heim et al. ................ | 296/56 |
| 6,102,470 | A | * | 8/2000 | Heim et al. ................ | 296/188 |
| 6,273,498 | B1 | * | 8/2001 | Hillman et al. ........ | 296/203.01 |
| 6,450,567 | B2 | * | 9/2002 | Toba et al. ................. | 296/197 |
| 2001/0020795 | A1 | * | 9/2001 | Toba et al. ................. | 296/195 |
| 2002/0000729 | A1 | * | 1/2002 | Phillips et al. ............. | 293/126 |

FOREIGN PATENT DOCUMENTS

| DE | 761 447 C | | 12/1944 | |
|---|---|---|---|---|
| DE | 199 13 532 A1 | | 9/1999 | |
| EP | 0076934 | * | 4/1983 | ............ 296/203.01 |
| EP | 0 270 097 A1 | | 6/1988 | |
| FR | 2773132 | * | 12/1997 | |
| GB | 2067480 | * | 7/1981 | ................. 296/197 |
| JP | 358033574 | * | 2/1983 | ................. 296/195 |
| WO | 092011159 | * | 7/1992 | ................. 296/195 |
| WO | WO 99/12798 | | 3/1999 | |

* cited by examiner

Primary Examiner—D. Glenn Dayoan
Assistant Examiner—H Gutman
(74) Attorney, Agent, or Firm—Oliff & Berridge, PLC

(57) ABSTRACT

The invention relates to a module forming all or part of the rear end of a motor vehicle, and suitable for being fitted onto the side rails (L) and the rear side portions of the motor vehicle. The module comprises at least two releasable side portions and it is arranged to receive or it already includes items of equipment such as, for example, an impact-absorber beam (3) or a floor (6).

32 Claims, 4 Drawing Sheets

REAR MODULE FOR A MOTOR VEHICLE

BACKGROUND OF THE INVENTION

The present invention relates to structural elements for motor vehicles, and more particularly to a rear structural element.

It is known to make motor vehicles by assembling various structural elements on a platform, which elements are in turn intended to support equipment such as elements of bodywork, a bumper, or lights.

To vary the style of the rear portions of vehicles, the sub-frames of the platform have modified rear portions.

The fact that different sub-frames are used complicates vehicle manufacture and increases cost price.

In addition, the rear portion of known motor vehicles is constituted by assembling together a relatively large number of structural elements, which has consequences on the surface treatments that need to be performed and on the time and number of operations needed to assemble the vehicle.

Finally, numerous structural elements of the rear portion of the vehicle are assembled together by welding, which makes them difficult to replace in the event of an accident, and gives rise to repair costs that are relatively high.

French patent No. FR-B-2 773 132 discloses a floor structure for a motor vehicle, which structure includes a basin of plastics material for receiving, in particular, a spare wheel. The basin is extend rearwards by a beam which serves to support a rear shield. The beam is arranged to bear against a metal cross-member fixed at each of its ends to the side walls of the vehicle. The presence of the metal cross-member significantly limits the amount of styling modification that can be applied to the rear portion of the vehicle. In addition, in the event of an accident, the cross-member can be damaged. Since the cross-member is not designed to be easily removed, repair costs are relatively high.

German patent application DE 199 13 532 describes a motor vehicle rear module comprising a reinforcing frame having elements, in particular a bumper, a tailgate, lights, and a reinforcing metal sheet preassembled thereon. The assembled module is put into place on the rear structure of the vehicle, and in particular it is fixed to the side rails. In the event of an accident, the reinforcing frame can be damaged, in which case it needs to be removed together with all of the elements it supports and replaced by a new frame, thus giving rise to repair that is complex and expensive.

SUMMARY OF THE INVENTION

A particular object of the present invention is to enable a car manufacturer to standardized platforms without harming the variety of styles on offer.

Another object of the invention is to reduce the cost of modifying the styling of a vehicle.

Another object of the invention is to reduce the cost of repairs, and also the time and the number of operations that are necessary for assembling the vehicle.

The invention provides a module forming all or part of the rear end of a motor vehicle, being suitable for being fitted to the side rails and to the rear side portions of the motor vehicle, said module comprising at least two releasable side portions and being arranged to receive or already including items of equipment.

This makes it possible to replace only a portion of the module in the event of only part of it being damaged, e.g. one of its two side portions.

The above-mentioned equipment can be selected, for example, from the following list: an impact-absorber beam; a floor; a rear shield; signaling devices; elements for sealing the vehicle cabin; elements for locking a door; and elements of the system for filling the fuel tank.

It is particularly advantageous for the rear module already to include a rear shield when it is mounted on the vehicle.

In addition to the two side portions, the module preferably also includes a central portion, the side portions being assembled to said central portion.

Advantageously, the fastenings between the central portion and the side portions are fastenings that are easily undone, which is advantageous if it is necessary to replace a portion of the module following an accident.

The module preferably has no welding between its component elements.

Also preferably, the module includes portions that enable it to be fastened without welding to the side rails and possibly also to the rear side portions of the vehicle body.

In a particular embodiment, the module is secured to a floor, which can be formed integrally with the central portion of the module or can be constituted by an element that is fitted thereto, in which case it is advantageous for the central portion of the module and the floor to be delivered to the car manufacturer in the assembled state.

The module can have side rail extenders and/or floor extenders, where such extenders can be fitted to the remainder of the module.

In the preassembled state, the floor can include trim for the trunk of the vehicle.

The floor can also have cavities enabling accessories and/or a spare wheel to be stored.

The floor can also include heat screens and/or sound screens together with elements for fastening items of equipment such as the exhaust muffler or the fuel tank.

In a particular embodiment, the module has link means fitted thereto or integrated therein for the purpose of supporting adjacent bodywork elements, e.g. a rear fender.

Advantageously, such link means are arranged so as to be capable of accommodating docking tolerances and/or differential expansion relative to bodywork elements.

Advantageously, the rear module includes housings for receiving or forming a portion of the lights, in particular signaling light inserts.

The rear module can also include means enabling a back door to be mounted, to pivot about a horizontal axis in the vicinity of its bottom edge.

In a particular embodiment, the module has a face that is visible from inside the vehicle, which makes it possible to avoid the need to fit additional trim for the purpose of covering it.

On its inside face, the module can have decorative elements that are specific to a given vehicle, where such decorative elements are advantageously delivered to the manufacturer preassembled with the rear module.

The module can also have channels for guiding electric wires, e.g. for the purpose of making it easier to install lights.

The invention also provides a novel method of manufacturing a motor vehicle, the method being characterized by the fact that it includes the following step:

fitting a structural rear module to the side rails and to the rear side portions of the vehicle body, said structural rear module comprising a small number of preassembled component elements, forming all or part of the rear end of the vehicle structure, and being designed to receive or already supporting items of equipment, said module comprising at least two releasable side portions.

By way of example, these items of equipment can be selected from the following list: an impact-absorbing beam; a floor; a rear shield; signaling devices; elements for providing sealing for the vehicle cabin; elements for locking a door; and elements of a system for filling the fuel tank.

When the module includes a floor, the module and the floor can be preassembled.

The invention makes it possible for the car manufacturer to standardized platforms while giving special styling by selecting which rear module is to be used.

This makes it possible to diversify vehicle styles at lower investment and lower cost, since there is no need to modify the platform as a function of which rear module is to be used, all of the rear modules being arranged so as to allow them to be secured to a standard platform.

The rear module replaces in particular the cross-member of a conventional platform, and as a result platforms no longer have to include cross-members that are specific to particular vehicle styles.

In addition, because the structure of the rear module enables it to be delivered to a manufacturer in an already fitted-out state, the time and the number of operations required for assembling the vehicle are decreased.

The rear module of the invention has a small number of parts, preferably fewer than five and more preferably still three, i.e. a central portion and two side portions.

BRIEF DESCRIPTION OF THE DRAWINGS

Other characteristics and advantages of the present invention will appear on reading the following detailed description of non-limiting embodiments, and on examining the accompanying drawings, in which.

DETAILED DESCRIPTION OF PREFERRED EMBODIMENTS

Figure 1:
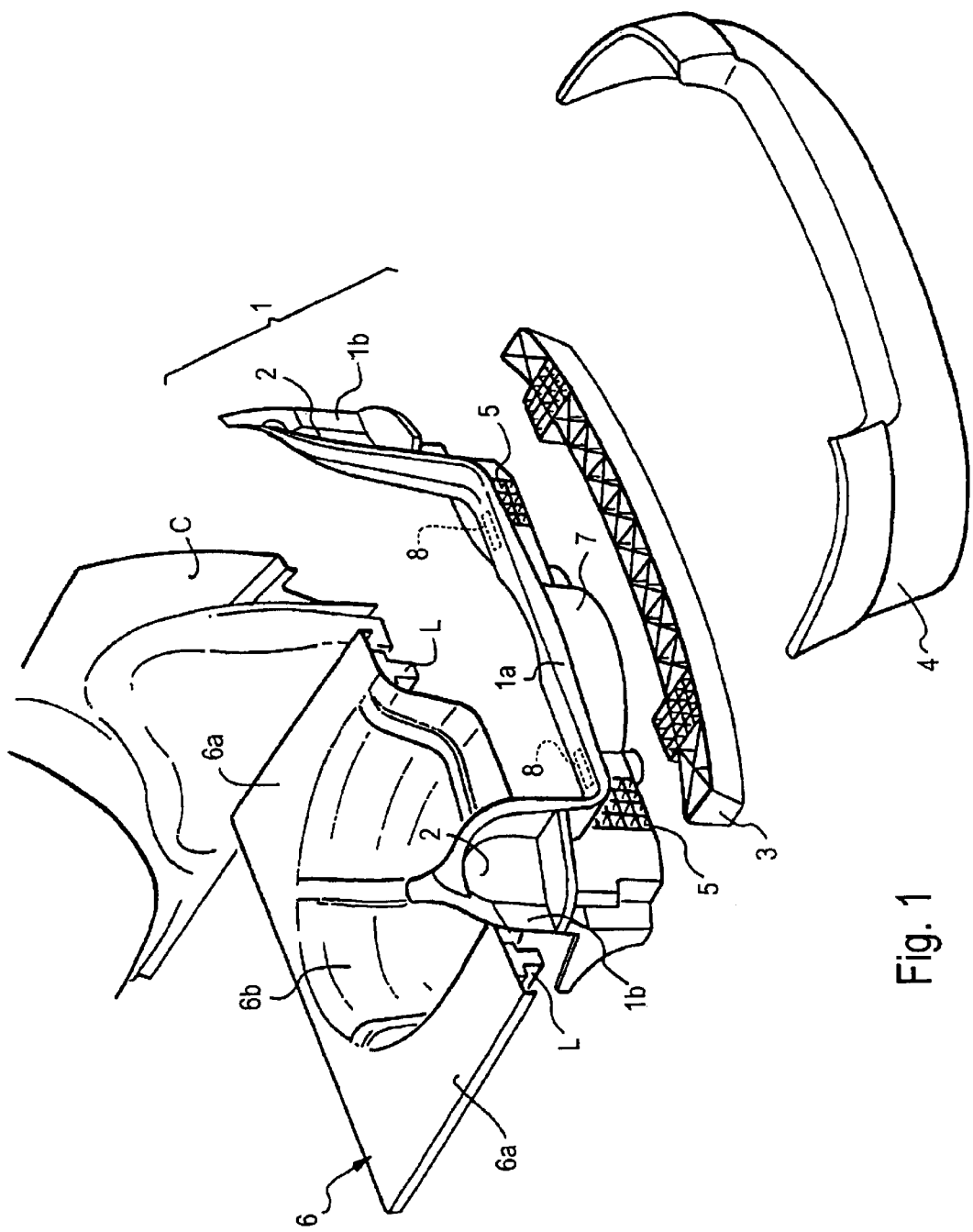
FIG. 1 is a diagrammatic exploded perspective view showing a rear module constituting a first embodiment of the invention.

FIG. 1 shows a rear module 1 which is constituted in this embodiment by assembling together a central portion 1a and two side portions 1b.

The central portion 1a and the side portions 1b in the embodiment described are all made of reinforced thermoplastic material.

The thermoplastic material can be reinforced using glass fiber cloth and/or metal inserts, for example.

The central portion 1a is assembled to the side portions 1b by fastening means that can easily be undone, possibly with adjustment for docking tolerances.

Figure 2:
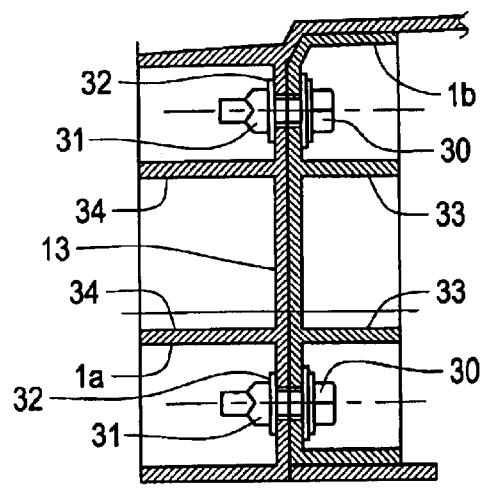
FIG. 2 is a diagrammatic and fragmentary section view of fastening means that can be used for assembling a side portion and a central portion of the module.

In the embodiment described, each side portion 1b includes a wall 12 that bears against a wall 13 of the central portion 1a, these walls 12 and 13 being assembled together by means of bolts 30 co-operating with nuts 31 and washers 32, as shown in FIG. 2.

The walls 12 and 13 support respective stiffening ribs 33 and 34.

In a variant, it is possible to use other fastener means suitable for enabling the central portion 1a or one of the side portions 1b to be replaced easily, in the event of it being damaged in an accident.

As general rule, the rear module 1 is arranged so as to enable it to be secured to the side rails L and to the rear side portions of the vehicle body C.

In the example described, the rear module 1 is secured to the side rails L without using welding, thus facilitating replacement, e.g. by using bolts.

The side rails L form part of a standard platform.

A variety of vehicle styles can be made using the same platform, by fitting rear modules of different shapes thereto.

Advantageously, as shown, the side portions 1b include housings 2 for receiving or constituting parts of the signaling light inserts (not shown).

The rear module 1 forms the rear skirt of the vehicle body and replaces the cross-member of conventional vehicle platforms of the kind described in above-cited French patent application No. FR-B-2 773 132, for example.

The rear module is arranged to receive both an impact-absorbing beam 3 for absorbing the energy of an impact, and also a rear shield 4.

Advantageously, the rear module 1 includes cellular structures 5 (as can be seen in FIG. 1) having walls that extend substantially along the axes of the side rails L, for the purpose of transmitting the forces exerted by the beam 3 to the side rails L of the vehicle.

The side portions 1b are shaped in such a manner as to match the shapes of the rear side portions of the body C when the rear module 1 is fixed to the side rails L.

In the embodiment described, the side portions 1b are also arranged so as to be fixed to the rear side portions of the vehicle body C.

In the embodiment of FIG. 1, the floor 6 is fixed on the side rails L before the rear module 1 is put into place.

The floor 6 has two side portions 6a that rest on the side rails L and a central depression 6b constituting a housing suitable for receiving the spare wheel, or a space-saver spare wheel, for example.

The central portion 1a has a wall 7 which finishes off the depression 6b when the rear module 1 is in place.

The wall 7 can be formed integrally with the remainder of the module 1 or it can be fitted thereto. The wall 7 then forms an extender to the floor 6 in the meaning of the present invention.

The central portion 1a can have hinges 8 represented highly diagrammatically by dashed lines in FIG. 1, enabling a door (not shown) to be assembled to the module 1 so as to be capable of pivoting about its bottom edge.

Two ways of assembling a bumper to a rear module are described below with reference to FIGS. 3 and 4.

Figure 3:
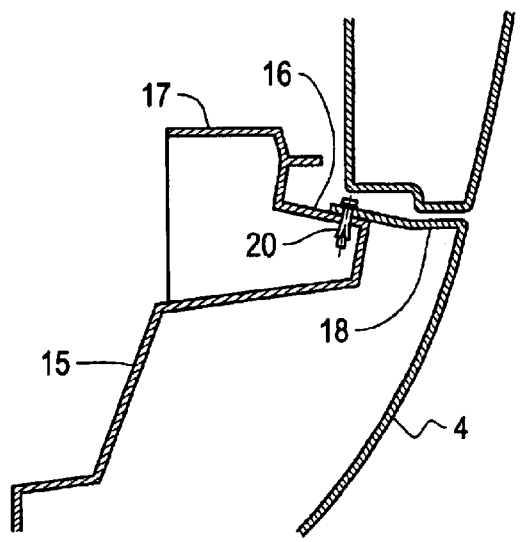
FIGS. 3 and 4 are fragmentary diagrammatic cross-sections of two examples of assembling a bumper to a rear module by means of rivets.

FIG. 3 shows a rear module 15 assembled to a shield 4' constituting an element of bodywork.

The module 15 has a folded-back portion 17 presenting a wall 16 against which there bears a folded-back portion 18 made at the top of the shield 4'.

The shield 4' is fixed to the rear module 15 by means of rivets 20 placed through the folded-back portion 18 and the wall 16.

Figure 4:
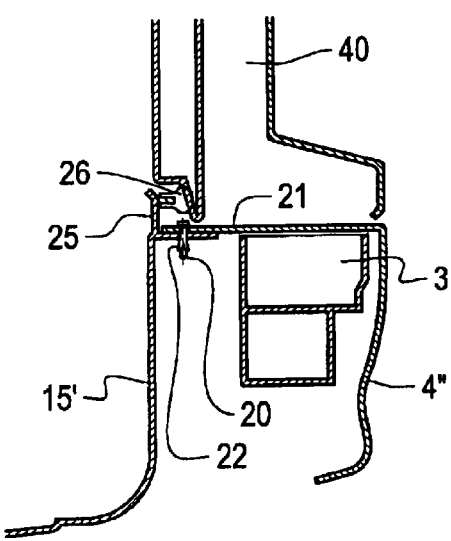

FIG. 4 shows a variant way of assembling a module 15' to a shield 4".

The module 15' has a rim 22 that is directed towards the outside of the vehicle and that forms a bearing surface for mounting a folded-back portion 21 formed at the top of the shield 4".

The shield 4" is secured to the module 15' by means of rivets 20 as in the assembly described above.

The module 15' also has a rib 25 supporting a sealing gasket 26 against which the tailgate 40 of the can come to bear.

The shield 4" covers an impact-absorbing beam 3 which is secured to the module 15' by fastenings that are not shown.

Various items of equipment, in particular the shield, can be secured to the rear module by any fastening means other than rivets, e.g. bolts.

The various elements of the rear module, in particular its central portion and one of its side portions, or an element fixed to one of the central and side portions can be held together by fastening means that accommodate docking tolerances.

Figure 5:
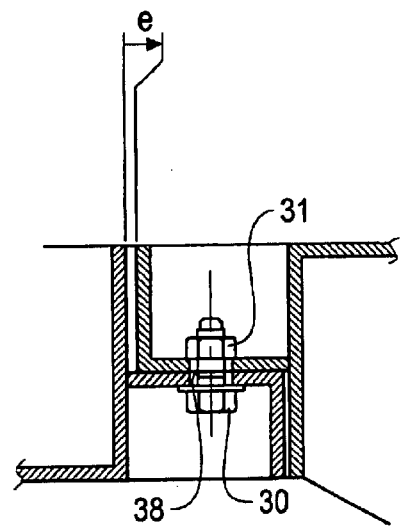
FIG. 5 is a fragmentary diagrammatic section view showing how a rear module can be assembled to an element of bodywork.

By way of example, FIG. 5 shows an assembly that enables such docking tolerances to be adjusted, which assembly has a bolt 30 engaged in an oblong hole 38 and co-operating with a nut 31.

The presence of the oblong hole makes it possible to adjust docking tolerances e between two elements that are assembled together.

Naturally, the invention is not limited to the embodiments described above.

Figure 6:
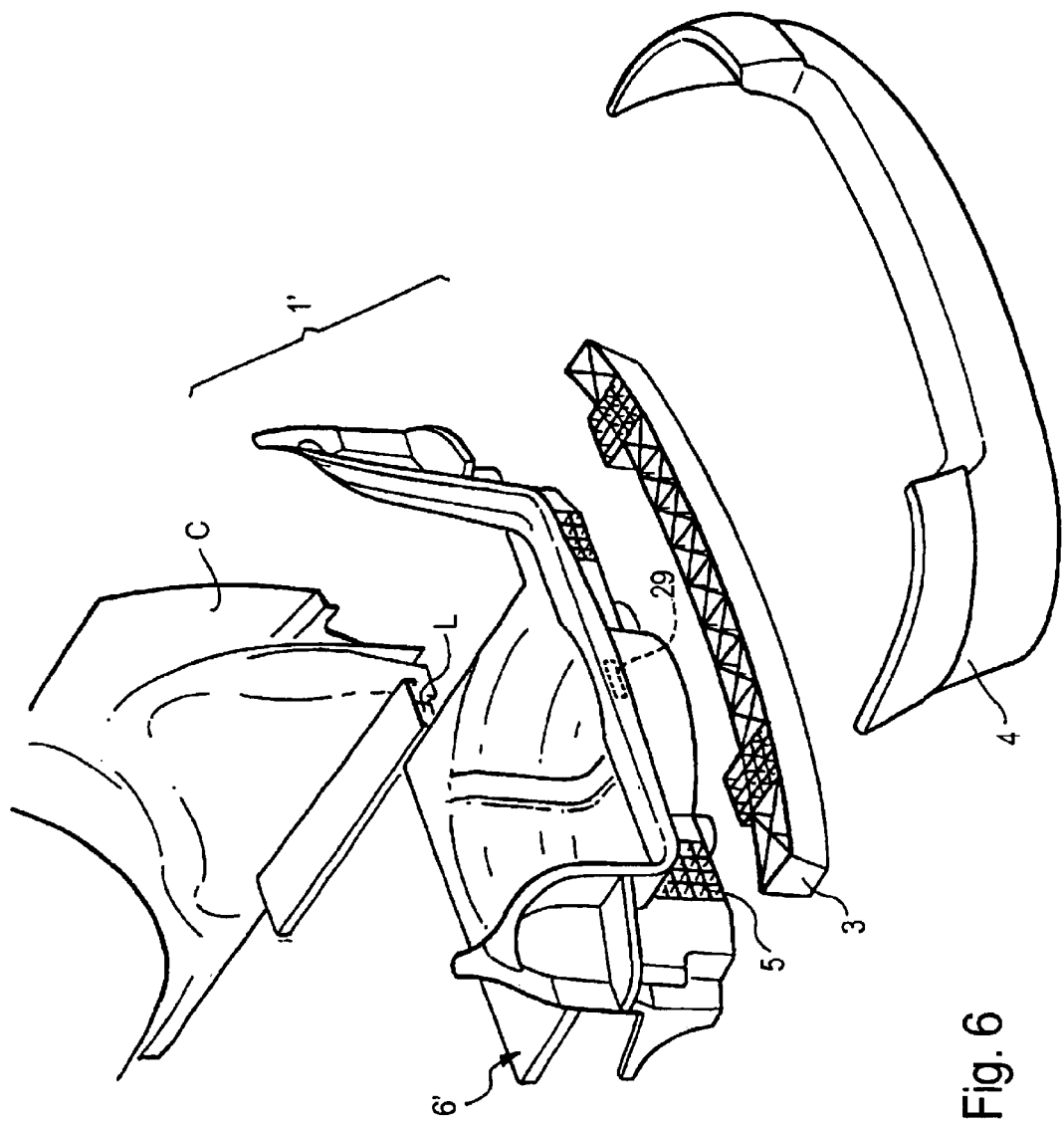
FIG. 6 is a view analogous to FIG. 1 showing a module constituting a second embodiment of the invention.

By way of example, FIG. 6 shows a rear module 1' which differs from the above-described rear module 1 by the fact that it is delivered to the manufacturer in a preassembled state together with a floor 6'.

In a variant, the floor 6' can be made integrally with the central portion of the rear module 1' by molding thermoplastic or thermosetting material.

Without going beyond the ambit of the present invention, it is possible to preassemble a large number of items of equipment and/or elements of bodywork onto the module that is delivered to the manufacturer.

Thus, for example, the rear floor can have preassembled thereto trim for the trunk or thermal screens and/or sound screens.

The module 1' can also be fitted with an element 29 for locking a door, shown in dashed lines in FIG. 6.

Figure 7:
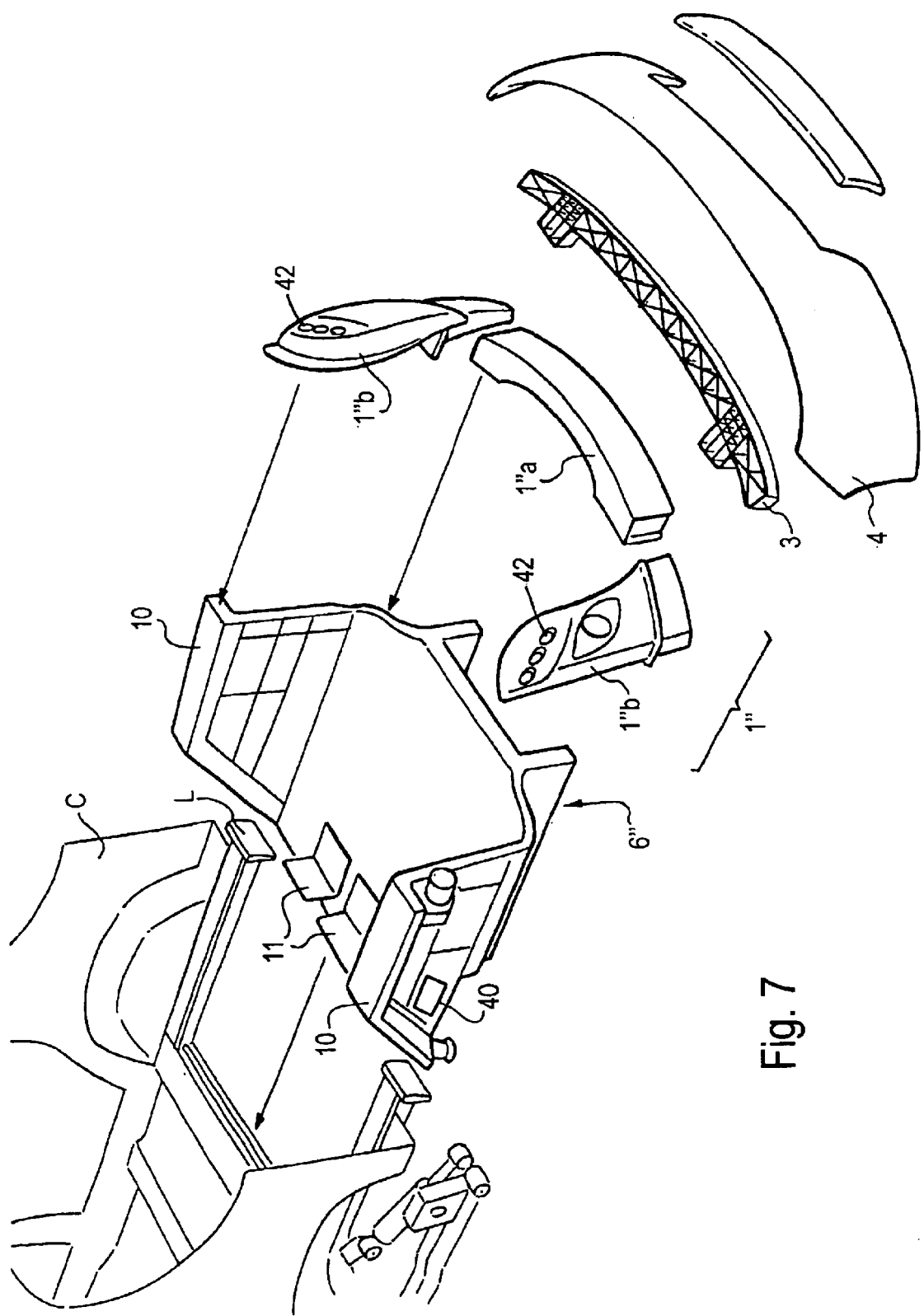
FIG. 7 is a view analogous to FIG. 1 showing a rear module constituting a third embodiment of the invention.

FIG. 7 shows a rear module 1" comprising a central portion 1"a and two side portions 1"b, the central portion 1"a being designed to be secured to the side rails L and to a floor 6", which floor is preassembled in particular with the trim for the wheel arches 10 and the hatches 11 for storing accessories. FIG. 7 also shows signaling devices (i.e., light inserts) 42 and elements 40 of the system for filling the fuel tank.

The rear module 1" is designed to receive an impact-absorber beam 3 and a rear shield 4.

What is claimed is:

1. In a motor vehicle comprising side rails and rear side portions, a module forming, at least partially, a rear end of said motor vehicle, wherein the module is suitable for being fitted to the side rails and to the rear side portions of the motor vehicle, said module comprising at least two releasable side portions made of reinforced thermoplastic material, said module being arranged to receive or already including items of equipment, and having a set of interlocking ribs, the set of interlocking ribs defining a cellular structure.

2. A module according to claim 1, the vehicle comprising a cabin and a system for filling a fuel tank, wherein said items of equipment are selected from the following list: an impact-absorber beam; a floor; a rear shield; signaling devices; elements for sealing said cabin; elements for locking a door; and elements of said system for filling the fuel tank.

3. A module according to claim 2, the vehicle comprising said rear shield, wherein said items of equipment comprise said rear shield.

4. A module according to claim 3, wherein in addition to the two side portions, the module further includes a central portion, with the side portions being assembled to the central portion.

5. A module according to claim 4, wherein the central portion is secured to the side portions via fastenings that are easily undone.

6. A module according to claim 5, comprising component elements assembled without welding.

7. A module according to claim 6, comprising portions that enable the module to be fastened without welding to the side rails of the vehicle.

8. A module according to claim 7, said vehicle having said floor, said module being secured to said floor.

9. A module according to claim 8, wherein the floor and the central portion are made as a single piece.

10. A module according to claim 9, comprising extenders for at least one of the side rails and the floor.

11. A module according to claim 10, wherein said extenders are fitted to a remainder of the module.

12. A module according to claim 11, wherein the floor has at least one cavity.

13. A module according to claim 1, the vehicle having elements of bodywork, said module comprising linking members for supporting said elements of bodywork.

14. A module according to claim 13, wherein the linking members are arranged in such a manner as to enable docking tolerances of said elements of bodywork to be accommodated.

15. A module according to claim 1, comprising housings for receiving or forming portions of light inserts.

16. A module according to claim 1, said vehicle having a rear door, said module comprising elements enabling said rear door having a bottom edge to be mounted to pivot about a horizontal axis in the vicinity of the bottom edge.

17. A module according to claim 16, comprising a face that is suitable for inside the vehicle.

18. A method of manufacturing a motor vehicle, said vehicle comprising side rails and side portions, the method comprising:

fitting a structural rear module to the side rails and to the rear side portions of a vehicle body, said structural rear module comprising a small number of preassembled component elements, forming, at least partially, a rear end of the vehicle and being designed to receive or already support items of equipment, said module comprising at least two releasable side portions made of reinforced thermoplastic material, and a set of interlocking ribs, the set of interlocking ribs defining a cellular structure.

19. A method according to claim 18, the vehicle comprising a cabin and a system for filling a fuel tank, wherein said items of equipment are selected from the following list: an impact-absorbing beam; a floor; a rear shield; signaling devices; elements for providing sealing for said cabin; elements for locking a door; and elements of said system for filling the fuel tank.

20. A method according to claim 19, the module including said floor, wherein the rear module and said floor are preassembled.

21. A module according to claim 1, forming all of the rear end of the vehicle.

22. A module according to claim 13, wherein the linking members are arranged in such a manner as to enable differential expansion of said elements of the bodywork to be accommodated.

23. A module according to claim 15, wherein the light inserts are signaling light inserts.

24. In a motor vehicle comprising a floor, side rails and rear side portions, a module forming, at least partially, a rear end of said motor vehicle, wherein the module is suitable for being fitted to the side rails and to the rear side portions of the motor vehicle, said module comprising a central portion and at least two releasable side portions being assembled to the central portion and wherein the floor and the central portion are made as a single piece.

25. In a motor vehicle comprising side rails, elements of bodywork and rear side portions, a module forming, at least partially, a rear end of said motor vehicle, wherein the module is suitable for being fitted to the side rails and to the rear side portions of the motor vehicle, said module comprising at least two releasable side portions and being arranged to receive or already including items of equipment, said module comprising linking members for supporting said elements of bodywork.

26. In a motor vehicle comprising side rails and rear side portions, a module forming, at least partially, a rear end of said motor vehicle, wherein the module is suitable for being fitted to the side rails and to the rear side portions of the motor vehicle, said module comprising at least two releasable side portions and comprising housings for receiving or forming portions of light inserts.

27. In a motor vehicle comprising side rails, a rear door and rear side portions, a module forming, at least partially, a rear end of said motor vehicle, wherein the module is suitable for being fitted to the side rails and to the rear side portions of the motor vehicle, said module comprising at least two releasable side portions and comprising elements enabling said rear door having a bottom edge to be mounted to pivot about a horizontal axis in the vicinity of the bottom edge.

28. In a motor vehicle comprising side rails and rear side portions, a module forming all of a rear end of said motor vehicle, wherein the module is suitable for being fitted to the side rails and to the rear side portions of the motor vehicle, said module comprising at least two releasable side portions and being arranged to receive or already including items of equipment.

29. A method of manufacturing a motor vehicle, said vehicle comprising side rails and side portions, the method comprising:
   fitting a structural rear module to the side rails and to the rear side portions of a vehicle body, said structural rear module comprising a floor that is preassembled with the module, said module forming, at least partially, a rear end of the vehicle and comprising at least two releasable side portions.

30. A module according to claim 1, wherein the reinforced thermoplastic material comprises at least one of glass fiber cloth and metal inserts.

31. A method according to claim 18, wherein the reinforced thermoplastic material comprises at least one of glass fiber cloth and metal inserts.

32. A module according to claim 1, said vehicle having side rails, wherein said cellular structure has walls that extend substantially along the axis of the side rails.

* * * * *